United States Patent
Li et al.

(10) Patent No.: US 11,259,063 B2
(45) Date of Patent: Feb. 22, 2022

(54) METHOD AND SYSTEM FOR SETTING VIDEO COVER

(71) Applicant: WANGSU SCIENCE & TECHNOLOGY CO., LTD., Shanghai (CN)

(72) Inventors: Xiaoman Li, Shanghai (CN); Fengqing Lian, Shanghai (CN); Jing Li, Shanghai (CN); Xiaoyu Huang, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 517 days.

(21) Appl. No.: 16/340,515

(22) PCT Filed: Jul. 12, 2018

(86) PCT No.: PCT/CN2018/095436
§ 371 (c)(1),
(2) Date: Apr. 9, 2019

(87) PCT Pub. No.: WO2019/237447
PCT Pub. Date: Dec. 19, 2019

(65) Prior Publication Data
US 2021/0368225 A1 Nov. 25, 2021

(30) Foreign Application Priority Data
Jun. 15, 2018 (CN) .......................... 201810621799.4

(51) Int. Cl.
*H04N 7/173* (2011.01)
*H04N 21/262* (2011.01)
(Continued)

(52) U.S. Cl.
CPC ..... *H04N 21/26208* (2013.01); *H04N 21/434* (2013.01); *H04N 21/435* (2013.01); *H04N 21/4402* (2013.01)

(58) Field of Classification Search
CPC .......... H04N 21/26208; H04N 21/434; H04N 21/435; H04N 21/4402
See application file for complete search history.

(56) References Cited

U.S. PATENT DOCUMENTS

| 2002/0116716 A1 | 8/2002 | Sideman |
| 2004/0095396 A1 | 5/2004 | Stavely et al. |

(Continued)

FOREIGN PATENT DOCUMENTS

| CN | 101778257 A | 7/2010 |
| CN | 101917387 A | 12/2010 |

(Continued)

OTHER PUBLICATIONS

The European Patent Office (EPO) The Extended European Search Report for 18865373.7 dated Jan. 10, 2020 12 Pages.

(Continued)

*Primary Examiner* — Gigi L Dubasky

(57) ABSTRACT

The present invention provides a method and a system for setting a video cover. The method includes: receiving, by a codec service cluster, a cover creation request carrying cover parameters of a target video, and obtaining, by the codec service cluster, a video file of the target video, wherein the cover parameters at least include a video segment identifier, a video segment rewind demand, and a video segment playback speed; according to the cover parameters of the target video and the video file of the target video, generating, by the codec service cluster, a cover video file of the target video; and feeding back, by the codec service cluster, the cover video file of the target video to enable a feedback (Continued)

receiver to set the video cover for the target video based on the cover video file.

14 Claims, 1 Drawing Sheet

(51) Int. Cl.
*H04N 21/435* (2011.01)
*H04N 21/434* (2011.01)
*H04N 21/4402* (2011.01)

(56) References Cited

U.S. PATENT DOCUMENTS

| | | | |
|---|---|---|---|
| 2007/0109446 A1 | 5/2007 | Jeong et al. | |
| 2009/0178089 A1* | 7/2009 | Picco | H04N 7/17336 |
| | | | 725/87 |
| 2012/0166950 A1* | 6/2012 | Frumar | H04N 21/6587 |
| | | | 715/719 |
| 2014/0219630 A1* | 8/2014 | Minder | H04N 21/8549 |
| | | | 386/241 |
| 2016/0307596 A1* | 10/2016 | Hardin | H04L 65/602 |
| 2017/0256288 A1* | 9/2017 | Ai | H04N 5/76 |
| 2018/0039469 A1 | 2/2018 | Han et al. | |
| 2019/0199763 A1* | 6/2019 | Demirli | H04L 65/602 |

FOREIGN PATENT DOCUMENTS

| | | | |
|---|---|---|---|
| CN | 103747362 | A | 4/2014 |
| CN | 104244024 | A | 12/2014 |
| CN | 105323657 | A | 2/2016 |
| CN | 105898571 | A | 8/2016 |
| CN | 106792218 | A | 5/2017 |
| CN | 107147938 | A | 9/2017 |
| CN | 107404412 | A | 11/2017 |
| CN | 107888988 | A | 4/2018 |
| CN | 107918656 | A | 4/2018 |
| CN | 107995535 | A | 5/2018 |

OTHER PUBLICATIONS

The World Intellectual Property Organization (WIPO) International Search Report and Written Opinion for PCT/CN2018/095436 dated Feb. 27, 2019 9 Pages.
The China National Intelleectual Property Administration (CNIPA) The China Search Report for 201810621799.4 dated Sep. 19, 2019 5 Pages.

* cited by examiner

METHOD AND SYSTEM FOR SETTING VIDEO COVER

CROSS-REFERENCES TO RELATED APPLICATIONS

This application is a national phase entry under 35 U.S.C § 371 of International Application No. PCT/CN2018/095436, filed on Jul. 12, 2018, which claims priority of Chinese Patent Application No. 201810621799.4, filed with the State Intellectual Property Office of P. R. China on Jun. 15, 2018, the entire content of all of which is incorporated herein by reference.

FIELD OF THE DISCLOSURE

The present disclosure generally relates to the field of video processing technology and, more particularly, relates to a method and a system for setting a video cover.

BACKGROUND

With the continuous development of video processing and network transmission technology, watching video has gradually become a current mainstream form of entertainment. A large number of user terminals are equipped with video playback software. Through the video playback software, users can play video provided by the video service backend.

The video service backend often provides a large number of videos and presents the videos to the user in a form of a video list. The video list may have a cover display window corresponding to each video for displaying a video cover, and the cover display window may display one or more frames of video images selected from a corresponding video file by the video service backend. Through the video cover, the user can intuitively judge the video content, and then select the video of interest from the video list for playback based on the judgment.

In the process of implementing the present invention, the inventors have found that the prior art has at least the following issues.

One or more frames of video images carry substantially little video content, and, thus, it is difficult to accurately and effectively present the characteristics of the entire video. Further, a plurality of videos in a same video list often have substantially high relevance, and the corresponding video covers have a substantially high similarity. Therefore, the users often do not perceive the difference in the video covers of the plurality of videos, and cannot quickly and accurately judge the video content.

BRIEF SUMMARY OF THE DISCLOSURE

To solve the issues of the prior art, the disclosed embodiments of the present invention provide a method and a system for setting a video cover. The technical solutions include the following.

One aspect of the present disclosure includes a method for setting a video cover, wherein the method comprises:
  receiving, by a codec service cluster, a cover creation request carrying cover parameters of a target video, and obtaining, by the codec service cluster, a video file of the target video, wherein the cover parameters at least include a video segment identifier, a video segment rewind demand, and a video segment playback speed;
  according to the cover parameters of the target video and the video file of the target video, generating, by the codec service cluster, a cover video file of the target video; and
  feeding back, by the codec service cluster, the cover video file of the target video to enable a feedback receiver to set the video cover for the target video based on the cover video file.

Optionally, according to the cover parameters of the target video and the video file of the target video, generating, by the codec service cluster, the cover video file of the target video includes:
  decoding, by the codec service cluster, the video file of the target video, and according to the video segment identifier, intercepting, by the codec service cluster, video frame data of at least one segment of the target video from the decoded video file;
  based on the video segment playback speed, setting, by the codec service cluster, the video frame data of the at least one segment of the target video;
  according to the video segment rewind demand, splicing, by the codec service cluster, the video frame data of the at least one segment of the target video in a forward order or a reverse order; and
  encapsulating, by the codec service cluster, the spliced video frame data to generate the cover video file of the target video.

Optionally, the cover parameters further include a target frame rate and a target format;
  decoding, by the codec service cluster, the video file of the target video includes:
    according to the target frame rate, setting, by the codec service cluster, the spliced video frame data to generate the video file of the target video; and
  encapsulating, by the codec service cluster, the spliced video frame data to generate the cover video file of the target video includes:
    according to the target format, encapsulating, by the codec service cluster, the spliced video frame data to generate the cover video file of the target video.

Optionally, the codec service cluster includes a scheduling server and a plurality of distributed, deployed codec nodes, and each codec node at least includes one codec server and one storage server.

Optionally, the method further includes:
  sending, by a codec server, operation status information to the scheduling server, wherein the operation status information at least includes a CPU usage rate, a memory usage rate, and a quantity of current tasks; and
  according to the operation status information, determining, by the scheduling server, a health value of the codec server.

Optionally, receiving, by the codec service cluster, the cover creation request carrying the cover parameters of the target video, and obtaining, by the codec service cluster, the video file of the target video include:
  receiving, by the scheduling server, the cover creation request carrying the cover parameters of the target video, and according to a health value of each codec server in the codec service cluster, determining, by the scheduling server, a target codec server; and
  receiving, by the target codec server, the cover creation request, which is sent by the scheduling server and carries the cover parameters of the target video, and obtaining, by the target codec server, the video file of the target video.

Optionally, after the feedback receiver sets the video cover for the target video based on the cover video file, the method further includes:
  when displaying the cover video file of the target video, if a click operation of the cover video file is detected, sending, by a target terminal, a target video acquisition request to a streaming media server that meets performance requirement; and
  downloading, by the streaming media server, the video file of the target video from the codec service cluster, and sending, by the streaming media server, the video file to the target terminal.

Another aspect of the present disclosure includes a system for setting a video cover, the system is applicable to a codec service cluster, and the codec service cluster is configured to:
  receive a cover creation request carrying cover parameters of a target video, and obtain a video file of the target video, wherein the cover parameters at least include a video segment identifier, a video segment rewind demand, and a video segment playback speed;
  according to the cover parameters of the target video and the video file of the target video, generate a cover video file of the target video; and
  feed back the cover video file of the target video to enable a feedback receiver to set the video cover for the target video based on the cover video file.

Optionally, the codec service cluster is specifically configured to:
  decode the video file of the target video, and according to the video segment identifier, intercept video frame data of at least one segment of the target video from the decoded video file;
  based on the video segment playback speed, set the video frame data of the at least one segment of the target video;
  according to the video segment rewind demand, splice the video frame data of the at least one segment of the target video in a forward order or a reverse order; and
  encapsulate the spliced video frame data to generate the cover video file of the target video.

Optionally, the cover parameters further include a target frame rate and a target format; and
  the codec service cluster is specifically configured to:
    according to the target frame rate, set the spliced video frame data to generate the video file of the target video, and
    according to the target format, encapsulate the spliced video frame data to generate the cover video file of the target video.

Optionally, the codec service cluster includes a scheduling server and a plurality of distributed, deployed codec nodes, and each codec node at least includes one codec server and one storage server.

Optionally, a codec server is configured to send operation status information to the scheduling server, wherein the operation status information at least includes a CPU usage rate, a memory usage rate, and a quantity of current tasks; and
  the scheduling server is configured to determine a health value of the codec server according to the operation status information.

Optionally, the scheduling server is configured to receive the cover creation request carrying the cover parameters of the target video, and according to a health value of each codec server in the codec service cluster, determine a target codec server; and the target codec server is configured to receive the cover creation request, which is sent by the scheduling server and carries the cover parameters of the target video, and obtain the video file of the target video.

Optionally, the system further includes a target terminal and at least one streaming media server, wherein:
  when displaying the cover video file of the target video, if a click operation of the cover video file is detected, the target terminal is configured to send a target video acquisition request to a streaming media server that meets performance requirement, and
  the streaming media server is configured to download the video file of the target video from the codec service cluster, and send the video file to the target terminal.

The technical solutions in the disclosed embodiments of the present invention may have the following beneficial effects.

In the disclosed embodiments of the present invention, the codec service cluster may receive the cover creation request carrying the cover parameters of the target video, and may obtain the video file of the target video. Further, the cover parameters may at least include the video segment identifier, the video segment rewind demand, and the video segment playback speed. According to the cover parameters of the target video and the video file of the target video, the codec service cluster may generate the cover video file of the target video. The codec service cluster may feed back the cover video file of the target video to enable the feedback receiver to set the video cover for the target video based on the cover video file. As such, video segments may be selected from the video file to create the cover video file, and cover parameters may be used to configure the cover video file with spliced by multiple segments having different playback speeds in forward order plus reverse order.

Therefore, the content of the video cover may be greatly enriched, such that the video cover may substantially effectively and intuitively display the characteristics of the entire video, and the user may substantially accurately judge the video content through the video cover, thereby improving the user experience.

BRIEF DESCRIPTION OF THE DRAWINGS

To more clearly illustrate the technical solutions in the disclosed embodiments of the present invention, drawings to be used in the description of the embodiments will be briefly described below. It is obvious that the drawings in the following description are certain embodiments of the present invention, and other drawings may be obtained by a person of ordinary skill in the art in view of the drawings provided without creative efforts.

DETAILED DESCRIPTION

For clearer understanding of the technical characteristics, aims and effects of the present invention, specific embodiments of the present invention are now described in detail with reference to the accompanying drawings.

Figure 1:
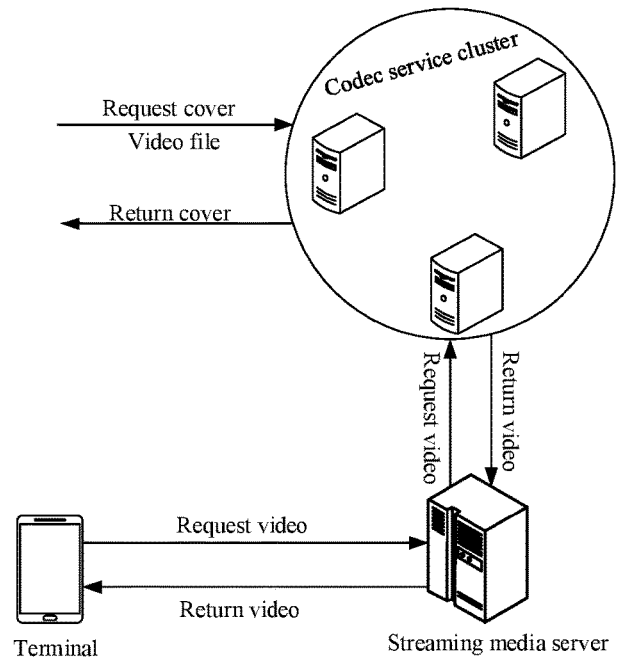
FIG. 1 illustrates a frame diagram of a system for setting a video cover consistent with an embodiment of the present invention.

The disclosed embodiments of the present invention provide a method for setting a video cover. The method may be mainly implemented by a codec service cluster, and may be supportively implemented by a terminal and a streaming media server. Further, the codec service cluster may be mainly composed of one or more codec servers. A codec server may be developed based on a Nginx platform, may support input of a video of common video format, resolution and bit rate, and may support both offline and real-time services. In response to a cover creation request of a video service party, the codec service cluster may be used to create a cover video file based on a corresponding video file. Herein, the video service party may be a provider of the video file and a demand-side of the video cover. The terminal may be installed with a video playback application developed by the video service party. Through the video playback application, the user may play the video file provided by the video service party. The streaming media server may be used to receive a video playback request of the terminal, pull a corresponding video file from the codec service cluster, and feed back the video file to the terminal. A detailed network frame diagram may be illustrated in FIG. 1. Each of the codec server, the terminal, and the streaming media server may include a processor, a memory, and a transceiver. The processor may be used to perform processing of setting a video cover in the following processes, the memory may be used to store required data and generated data in the following processes, and the transceiver may be used to receive and transmit relevant data in the following processes.

Figure 2:
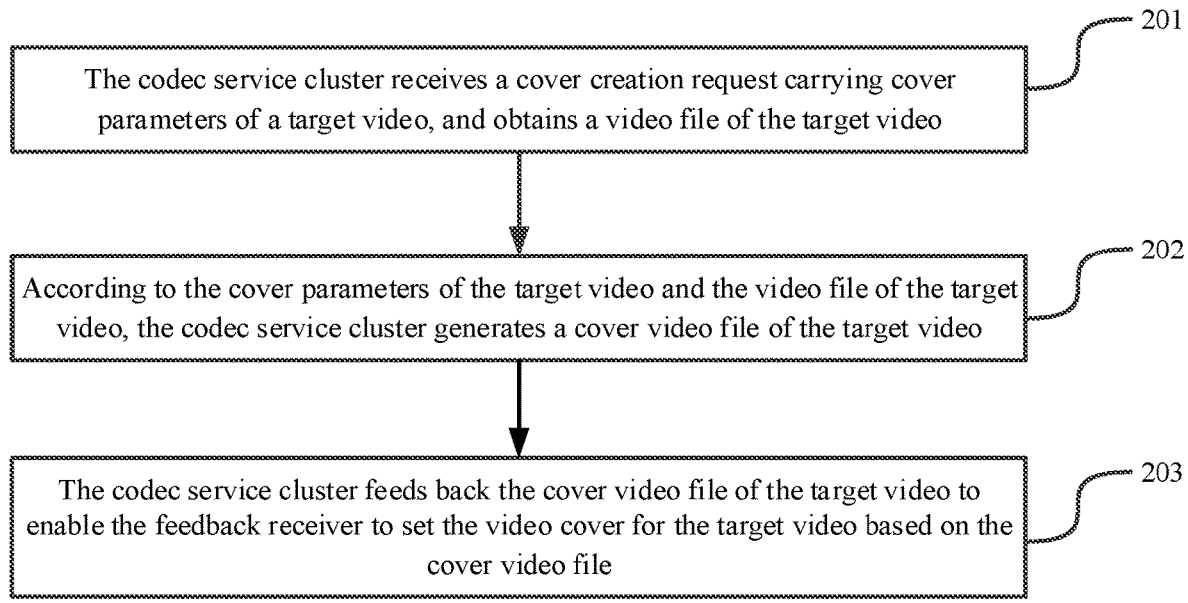
FIG. 2 illustrates a flowchart of a method for setting a video cover consistent with an embodiment of the present invention.

The processing flow illustrated in FIG. 2 will be described in detail below with reference to specific implementations, and the content may include the following.

Step 201: The codec service cluster may receive a cover creation request carrying cover parameters of a target video, and may obtain a video file of the target video.

The cover parameters may at least include a video segment identifier, a video segment rewind demand, and a video segment playback speed.

In one embodiment, when the video service party desires to set a video cover for a certain video, an API interface provided by the codec service cluster may be invoked, then a video file of the certain video may be uploaded through the API interface, and at the same time, a corresponding cover creation request may be submitted. The disclosed embodiments may be subsequently described using the target video as an example. Next, the codec service cluster may receive the corresponding cover creation request and obtain the video file of the target video. The cover creation request may carry the cover parameters of the target video, and the cover parameters may at least include the following three items: 1. the video segment identifier, used to indicate which video data in the video file constitutes the video cover, including one video segment identifier or a plurality of video segment identifiers, with each video segment identifier being represented by a video segment start time and a video segment duration; 2. the video segment rewind demand, used to indicate whether the video data of each video segment in the video cover is arranged in forward order or reverse order; 3. the video segment playback speed, used to indicate the playback speed of the video data of each video segment in the video cover. It should be noted that the above three cover parameters may correspond one-to-one with each other, and each may support multiple numerical input. In other words, the video cover may be composed of a plurality of video segments, each video segment may be arbitrarily set to played in a forward order or a reverse order, and the playback speed of each video segment may be the same or different.

Step 202: According to the cover parameters of the target video and the video file of the target video, the codec service cluster may generate a cover video file of the target video.

In one embodiment, after receiving the cover creation request, according to the cover parameters of the target video carried therein, the codec service cluster may process the video file of the target video to generate the cover video file of the target video.

Optionally, for the three cover parameters given in step 201, the processing of step 202 may include the detailed following. The codec service cluster may decode the video file of the target video, and according to the video segment identifier, may intercept video frame data of at least one segment of the target video in the decoded video file. Based on the video segment playback speed, the codec service cluster may set the video frame data of the at least one segment of the target video. According to the video segment rewind demand, the codec service cluster may splice the video frame data of the at least one segment of the target video in a forward order or a reverse order. The codec service cluster may encapsulate the spliced video frame data to generate the cover video file of the target video.

In one embodiment, after receiving the cover creation request of the target video carrying the three cover parameters of the video segment identifier, the video segment rewind demand, and the video segment playback speed, the codec service cluster may intercept the three cover parameters from the cover creation request, and then based on the video file of the target video, may generate the cover video file of the target video according to the cover parameters. Specifically, the codec service cluster may first decode the video file of the target video, and then according to the video segment identifier, may intercept the video frame data of the at least one segment of the target video in the decoded video file. Next, according to the video segment playback speed, the codec service cluster may set the intercepted video frame data of the segment of the target video. In other words, a time stamp corresponding to the video frame data may be adjusted using the video segment playback speed as a scaling ratio. Next, according to the video segment rewind demand, the codec service cluster may splice the intercepted video frame data of the segment of the target video in a forward order or a reverse order using the time stamp as standard. Next, the codec service cluster may encapsulate the spliced video frame data to generate the cover video file of the target video.

For ease of understanding, the process of generating the cover video file may be described by way of examples herein. In the cover parameters, the video segment identifier may include: A (time stamp corresponding to 2:00-2:03), B (time stamp corresponding to 10:33-10:43), and C (time stamp corresponding to 10:33-10:43). The video segment rewind demand may include: A no, B no, and C Yes. The video segment playback speed may include: A normal speed, B triple speed, and C triple speed. The codec service cluster may decode the video file, and may intercept video frame data of both video segment of 2:00-2:03 and video segment of 10:33-10:43 in the video file. Then, the video frame data of the video segment of 2:00-2:03 may be spliced in a forward order, and the video frame data of the video segment of 10:33-10:43 may be spliced in a forward order once and in a reverse order once to generate three video segments. The three video segments may be spliced together. Ultimately, the three video segments may be encapsulated according to playback speeds of normal speed, triple speed and triple speed, respectively, to generate the cover video file. It can be seen that the video frame data corresponding to the video segment B and the video segment C may be consistent, while may have different video segment rewind demand. Based on such processing, it is possible to achieve a dynamic effect showing a forward order plus a reverse order, as in examples including water being poured out and reversing back into a basin, and a ball being thrown out and turning back to the hand. Alternatively, the codec service cluster may decode the video file, and may intercept the video frame data of three video segments of 2:00-2:03, 10:33-10:43, and 10:33-10:43 in the video file. Then, the three video segments may be set according to the playback speeds of normal speed, triple speed and triple speed, respectively. Next, the three video segments may be processed in a forward order, a forward order, and a reverse order, respectively, to generate another three video segments. Next, the another three video segments may be spliced together. Ultimately, the spliced another three video segments may be encapsulated to generate the cover video file. Therefore, the dynamic effect showing a forward order plus a reverse order, as in examples including water being poured out and reversing back into a basin, and a ball being thrown out and turning back to the hand, may be achieved.

In addition, the video segment identifier in the cover creation request may further designate video data in any other video file. Based on the above example, the video segment identifier C may be: C (video file X, time stamp Y), and, thus, when generating the cover video file of the target video, the codec service cluster may further obtain all the video files designated by the video segment identifier.

Optionally, the cover parameters may further include a frame rate and a format. The codec service cluster may generate a cover video file of designated frame rate and format. Correspondingly, the above processing of generating the cover video file may include the following. According to a target frame rate, the codec service cluster may set the spliced video frame data to generate the video file of the target video. According to the video segment identifier, the video frame data of at least one segment of the target video in the decoded video file may be intercepted. Based on the video segment playback speed, the codec service cluster may set the video frame data of the at least one segment of the target video. According to the video segment rewind demand, the codec service cluster may splice the video frame data of the at least one segment of the target video in a forward order or a reverse order. The codec service cluster may encapsulate the spliced video frame data according to a target format to generate the cover video file of the target video.

In one embodiment, if the cover parameters carried by the cover creation request further include the target frame rate and the target format, in the above process of generating the cover video file, when decoding the video file of the target video, the codec service cluster may set the spliced video frame data according to the target frame rate to generate the video file of the target video. The video frame data may be encapsulated according to the target format when being encapsulated. The rest of the processing may be consistent with the foregoing content, and the description is not repeated herein. If the cover parameters carried by the cover creation request do not include the target frame rate and the target format, the process may be performed according to the default frame rate and format. It can be understood that because the data amount of the video cover is substantially small, the frame rate may be appropriately reduced, and, thus, the transmission bandwidth and storage space may be reduced. The codec service cluster may support a plurality of formats, e.g., gif and webp, etc., and may use the webp format with substantially high compression ratio by default. In the webp format, if a splice of forward order plus reverse order is desired, a temporary video file generated during the processing process may desire to be saved as a video format.

It is worth mentioning that the cover parameters carried by the cover creation request may further include a video segment splicing order. The video segment splicing order may be used to designate a playback sequence relationship of each video segment included in the cover video file. Based on the above example for description, if the video segment splicing order is B-C-A, in the cover video file, the video frame data of the segment B may be first played, then the video frame data of the segment C may be played, and ultimately, the video frame data of the segment A may be played. If the cover creation request does not carry the video segment splicing order, the cover video file may be generated in the order from small time stamp to large time stamp by default.

Step 203: The codec service cluster may feed back the cover video file of the target video to enable the feedback receiver to set a video cover for the target video based on the cover video file.

In one embodiment, after generating the cover video file of the target video, the codec service cluster may feed back the cover video file of the target video to a preset feedback receiver. The feedback method herein may include directly sending the cover video file, feeding back a download address of the cover video file, or any other feasible feedback method. In this way, after obtaining the cover video file of the target video, the feedback receiver may set the cover video file as the video cover of the target video, and may establish a link relationship between the cover video file and the video file of the target video.

Optionally, the foregoing codec service cluster may include a scheduling server and a plurality of distributed, deployed codec nodes, and each codec node may at least include one codec server and one storage server.

Further, the scheduling server may be used to manage all the codec nodes, and may schedule and assign the video cover generation task in the codec service cluster. The codec server may be used to execute the detailed generation process of the cover video file. The storage server may be replaced by a storage unit in the codec server, and may be used to store the obtained video file and generate the cover video file.

Optionally, the scheduling server in the codec service cluster may record a health value of each codec server, and the corresponding processing may include the following. The codec server may send operation status information to the scheduling server, and the scheduling server may determine the health value of the codec server according to the operation status information.

The operation status information may at least include a CPU usage rate, a memory usage rate, and a quantity of current tasks.

In one embodiment, each codec server may detect the operation status information thereof, e.g., the CPU usage rate, the memory usage rate, and the quantity of current tasks, etc., during the operation process, and then may send the detected operation status information to the scheduling server. Herein, the codec server may periodically send the operation status information, or may send the operation status information when detecting that the operation status information changes greatly, or may send the operation status information according to any other reasonably feasible preset rule. After obtaining the operation status information, the scheduling server may determine the health value of the codec server according to the operation status information. Therefore, according to the health value of each codec server, the scheduling and management of the video cover generation task may be implemented.

Optionally, the scheduling and management of the video cover generation task by the scheduling server of the codec service cluster may specifically include the following. The scheduling server may receive the cover creation request carrying the cover parameters of the target video, and according to the health value of each codec server in the codec service cluster, may determine a target codec server. The target codec server may receive the cover creation request, which is sent by the scheduling server and carries the cover parameters of the target video, and may obtain the video file of the target video.

In one embodiment, after receiving the cover creation request carrying the cover parameters of the target video, the scheduling server may determine the health value of each codec server in the codec service cluster, and then may determine the target codec server according to the health value. It can be understood that the health value of the codec server may reflect the loaded state and the remaining load capacity of the current codec server. Therefore, the target codec server determined by the scheduling server may be a codec server with the minimum current load, thereby implementing the load balancing in the codec service cluster. Thereafter, the scheduling server may send the above cover creation request to the target codec server. After receiving the cover creation request, the target codec server may obtain the video file of the target video and may perform the subsequent generation processing of the cover video file.

The disclosed embodiments further provide a method for obtaining a video file, and the specific processing may include the following. When displaying the cover video file of the target video, if a click operation of the cover video file is detected, a target terminal may send a target video acquisition request to the streaming media server that meets the performance requirement. The streaming media server may download the video file of the target video from the codec service cluster, and may send the video file to the target terminal.

Further, streaming media servers may be deployed according to a distributed architecture, and different streaming media server may provide video file acquisition service for the terminal in the neighborhood.

In one embodiment, after the feedback receiver sets the video cover for the target video based on the cover video file, when the user searches for the target video through the video playback application installed on the target terminal, the target terminal may display the cover video file of the target video and video information of the target video. As thus, if the user clicks the cover video file of the target video, the target terminal may detect the click operation of the cover video file, and, thus, may send the target video acquisition request to the streaming media server that meets the performance requirement. Herein, the performance requirement may be a minimum load and/or a nearest distance, etc. It should be noted that if the cover video file adopts a webp format, the target terminal may integrate an open source libwebp library, such that a codec processing of the webp format may be realized. After receiving the acquisition request of the target terminal, the streaming media server may download the video file of the target video from the codec service cluster, and then may send the video file to the target terminal.

In the disclosed embodiments of the present invention, the codec service cluster may receive the cover creation request carrying the cover parameters of the target video, and may obtain the video file of the target video. Further, the cover parameters may at least include the video segment identifier, the video segment rewind demand, and the video segment playback speed. According to the cover parameters of the target video and the video file of the target video, the codec service cluster may generate the cover video file of the target video. The codec service cluster may feed back the cover video file of the target video to enable the feedback receiver to set the video cover for the target video based on the cover video file. As such, video segments may be selected from the video file to create the cover video file, and cover parameters may be used to configure the cover video file with spliced by multiple segments having different playback speeds in forward order plus reverse order. Therefore, the content of the video cover may be greatly enriched, such that the video cover may substantially effectively and intuitively display the characteristics of the entire video, and the user may substantially accurately judge the video content through the video cover, thereby improving the user experience.

Based on a same technical concept, the disclosed embodiments of the present invention further provide a system for setting a video cover. The system may be applicable to a codec service cluster, and the codec service cluster may be configured to:

receive a cover creation request carrying cover parameters of a target video, and obtain a video file of the target video, where the cover parameters may at least include a video segment identifier, a video segment rewind demand, and a video segment playback speed;

according to the cover parameters of the target video and the video file of the target video, generate a cover video file of the target video; and feed back the cover video file of the target video to enable a feedback receiver to set the video cover for the target video based on the cover video file.

Optionally, the codec service cluster may be specifically configured to:

decode the video file of the target video, and according to the video segment identifier, intercept video frame data of at least one segment of the target video from the decoded video file;

based on the video segment playback speed, set the video frame data of the at least one segment of the target video;

according to the video segment rewind demand, splice the video frame data of the at least one segment of the target video in a forward order or a reverse order; and encapsulate the spliced video frame data to generate the cover video file of the target video.

Optionally, the cover parameters may further include a target frame rate and a target format.

The codec service cluster may be specifically configured to:

according to the target frame rate, set the spliced video frame data to generate the video file of the target video; and according to the target format, encapsulate the spliced video frame data to generate the cover video file of the target video.

Optionally, the codec service cluster may include a scheduling server and a plurality of distributed, deployed codec nodes, and each codec node may at least include one codec server and one storage server.

Optionally, the codec server may be configured to send operation status information to the scheduling server. The operation status information may at least include a CPU usage rate, a memory usage rate, and a quantity of current tasks.

The scheduling server may be configured to determine a health value of the codec server according to the operation status information.

Optionally, the scheduling server may be configured to receive the cover creation request carrying the cover parameters of the target video, and according to a health value of each codec server in the codec service cluster, determine a target codec server.

The target codec server may be configured to receive the cover creation request, which is sent by the scheduling server and carries the cover parameters of the target video, and obtain the video file of the target video.

Optionally, the system may further include a target terminal and at least one streaming media server, where:
when displaying the cover video file of the target video, if a click operation of the cover video file is detected, a target terminal may be configured to send a target video acquisition request to the streaming media server that meets performance requirement; and
the streaming media server may be configured to download the video file of the target video from the codec service cluster, and send the video file to the target terminal.

In the disclosed embodiments of the present invention, the codec service cluster may receive the cover creation request carrying the cover parameters of the target video, and may obtain the video file of the target video. Further, the cover parameters may at least include the video segment identifier, the video segment rewind demand, and the video segment playback speed. According to the cover parameters of the target video and the video file of the target video, the codec service cluster may generate the cover video file of the target video. The codec service cluster may feed back the cover video file of the target video to enable the feedback receiver to set the video cover for the target video based on the cover video file. As such, video segments may be selected from the video file to create the cover video file, and cover parameters may be used to configure the cover video file with spliced by multiple segments having different playback speeds in forward order plus reverse order. Therefore, the content of the video cover may be greatly enriched, such that the video cover may substantially effectively and intuitively display the characteristics of the entire video, and the user may substantially accurately judge the video content through the video cover.

A person skilled in the art can understand that all or part of the procedures implementing the above embodiments may be completed through a hardware, or may be completed by instructing a related hardware through a program. The program may be stored in a computer-readable storage medium. The storage medium mentioned above may be a read-only memory, a magnetic disk, or an optical disk, etc.

The above descriptions are merely the preferred embodiments of the present invention, and are not intended to limit the present invention. Any modifications, equivalents, improvements, etc., which are within the spirit and scope of the present invention, should be included in the protection of the present invention.

What is claimed is:

1. A method for setting a video cover, wherein the method comprises:
receiving, by a codec service cluster, a cover creation request carrying cover parameters of a target video, and obtaining, by the codec service cluster, a video file of the target video, wherein the cover parameters at least include a video segment identifier, a video segment rewind demand, and a video segment playback speed;
according to the cover parameters of the target video and the video file of the target video, generating, by the codec service cluster, a cover video file of the target video; and
feeding back, by the codec service cluster, the cover video file of the target video to enable a feedback receiver to set the video cover for the target video based on the cover video file.

2. The method according to claim 1, wherein according to the cover parameters of the target video and the video file of the target video, generating, by the codec service cluster, the cover video file of the target video includes:
decoding, by the codec service cluster, the video file of the target video, and according to the video segment identifier, intercepting, by the codec service cluster, video frame data of at least one segment of the target video from the decoded video file;
based on the video segment playback speed, setting, by the codec service cluster, the video frame data of the at least one segment of the target video;
according to the video segment rewind demand, splicing, by the codec service cluster, the video frame data of the at least one segment of the target video in a forward order or a reverse order; and
encapsulating, by the codec service cluster, the spliced video frame data to generate the cover video file of the target video.

3. The method according to claim 2, wherein:
the cover parameters further include a target frame rate and a target format;
decoding, by the codec service cluster, the video file of the target video includes:
according to the target frame rate, setting, by the codec service cluster, the spliced video frame data to generate the video file of the target video; and
encapsulating, by the codec service cluster, the spliced video frame data to generate the cover video file of the target video includes:
according to the target format, encapsulating, by the codec service cluster, the spliced video frame data to generate the cover video file of the target video.

4. The method according to claim 1, wherein:
the codec service cluster includes a scheduling server and a plurality of distributed, deployed codec nodes, and each codec node at least includes one codec server and one storage server.

5. The method according to claim 4, wherein the method further includes:
sending, by a codec server, operation status information to the scheduling server, wherein the operation status information at least includes a CPU usage rate, a memory usage rate, and a quantity of current tasks; and
according to the operation status information, determining, by the scheduling server, a health value of the codec server.

6. The method according to claim 5, wherein receiving, by the codec service cluster, the cover creation request carrying the cover parameters of the target video, and obtaining, by the codec service cluster, the video file of the target video include:
receiving, by the scheduling server, the cover creation request carrying the cover parameters of the target video, and according to a health value of each codec server in the codec service cluster, determining, by the scheduling server, a target codec server; and receiving, by the target codec server, the cover creation request, which is sent by the scheduling server and carries the cover parameters of the target video, and obtaining, by the target codec server, the video file of the target video.

7. The method according to claim 1, after the feedback receiver sets the video cover for the target video based on the cover video file, further including:

when displaying the cover video file of the target video, if a click operation of the cover video file is detected, sending, by a target terminal, a target video acquisition request to a streaming media server that meets performance requirement; and downloading, by the streaming media server, the video file of the target video from the codec service cluster, and sending, by the streaming media server, the video file to the target terminal.

8. A system for setting a video cover, wherein the system is applicable to a codec service cluster, and the codec service cluster is configured to:

receive a cover creation request carrying cover parameters of a target video, and obtain a video file of the target video, wherein the cover parameters at least include a video segment identifier, a video segment rewind demand, and a video segment playback speed;

according to the cover parameters of the target video and the video file of the target video, generate a cover video file of the target video; and feed back the cover video file of the target video to enable a feedback receiver to set the video cover for the target video based on the cover video file.

9. The system according to claim 8, wherein the codec service cluster is specifically configured to:

decode the video file of the target video, and according to the video segment identifier, intercept video frame data of at least one segment of the target video from the decoded video file;

based on the video segment playback speed, set the video frame data of the at least one segment of the target video;

according to the video segment rewind demand, splice the video frame data of the at least one segment of the target video in a forward order or a reverse order; and encapsulate the spliced video frame data to generate the cover video file of the target video.

10. The system according to claim 9, wherein:

the cover parameters further include a target frame rate and a target format; and the codec service cluster is specifically configured to:

according to the target frame rate, set the spliced video frame data to generate the video file of the target video, and according to the target format, encapsulate the spliced video frame data to generate the cover video file of the target video.

11. The system according to claim 8, wherein:

the codec service cluster includes a scheduling server and a plurality of distributed, deployed codec nodes, and each codec node at least includes one codec server and one storage server.

12. The system according to claim 11, wherein:

a codec server is configured to send operation status information to the scheduling server, wherein the operation status information at least includes a CPU usage rate, a memory usage rate, and a quantity of current tasks; and the scheduling server is configured to determine a health value of the codec server according to the operation status information.

13. The system according to claim 12, wherein:

the scheduling server is configured to receive the cover creation request carrying the cover parameters of the target video, and according to a health value of each codec server in the codec service cluster, determine a target codec server; and the target codec server is configured to receive the cover creation request, which is sent by the scheduling server and carries the cover parameters of the target video, and obtain the video file of the target video.

14. The system according to claim 8, further including:

a target terminal and at least one streaming media server, wherein:

when displaying the cover video file of the target video, if a click operation of the cover video file is detected, the target terminal is configured to send a target video acquisition request to a streaming media server that meets performance requirement, and the streaming media server is configured to download the video file of the target video from the codec service cluster, and send the video file to the target terminal.

* * * * *